United States Patent [19]

Boudjack

[11] Patent Number: 5,165,312
[45] Date of Patent: Nov. 24, 1992

[54] TOOL FOR MOVING TWO MECHANICAL PIECES AWAY FROM EACH OTHER

[76] Inventor: Jacques Boudjack, 426, boul, Frontenac (Québec), Canada, C0M 1A0

[21] Appl. No.: 756,280

[22] Filed: Sep. 6, 1991

[51] Int. Cl.⁵ .......................... B25B 11/00; B25B 7/12; B60C 25/14; B23P 19/04
[52] U.S. Cl. ........................................ 81/485; 81/15.3; 81/302
[58] Field of Search ............... 81/484, 485, 486, 15.2, 81/15.3, 9.24, 9.3, 302; 29/215, 225, 235, 239

[56] References Cited

U.S. PATENT DOCUMENTS

| | | | |
|---|---|---|---|
| 1,090,564 | 3/1914 | Petersen | 81/15.3 |
| 1,373,348 | 3/1921 | Nation | 81/15.3 |
| 1,816,997 | 8/1931 | Brown | 81/302 |
| 2,222,744 | 11/1940 | Gallien, Jr. | 81/302 |
| 2,642,264 | 6/1953 | Perry | 81/15.3 |
| 2,817,877 | 12/1957 | Fannen | |
| 2,881,493 | 4/1959 | Cochran | 81/302 |
| 4,768,408 | 9/1988 | Boudjack | 81/485 |
| 4,776,245 | 10/1988 | Gustavsson | 81/486 |

FOREIGN PATENT DOCUMENTS

| | | | |
|---|---|---|---|
| 163824 | 7/1915 | Canada | |
| 356837 | 3/1936 | Canada | |
| 782402 | 9/1957 | United Kingdom | 29/215 |

Primary Examiner—Frank T. Yost
Assistant Examiner—Paul M. Heyrana, Sr.
Attorney, Agent, or Firm—Longacre & White

[57] ABSTRACT

A tool for moving first and second mechanical pieces away from each other comprises a first arm with a handgrip portion, a second arm having a proximate end pivotally connected to the first arm, a first notch formed on a free end of the first arm opposite to the handgrip portion, and a second notch formed on the distal free end of the second arm. At least one notch is oriented in a direction defining an acute angle with the longitudinal axis of the corresponding arm, to enable the first and second notches to fully engage generally facing edges of the mechanical pieces before the first and second arms are pivoted manually about the pivotal connection and through the handgrip portion to move the mechanical pieces away from each other.

14 Claims, 3 Drawing Sheets

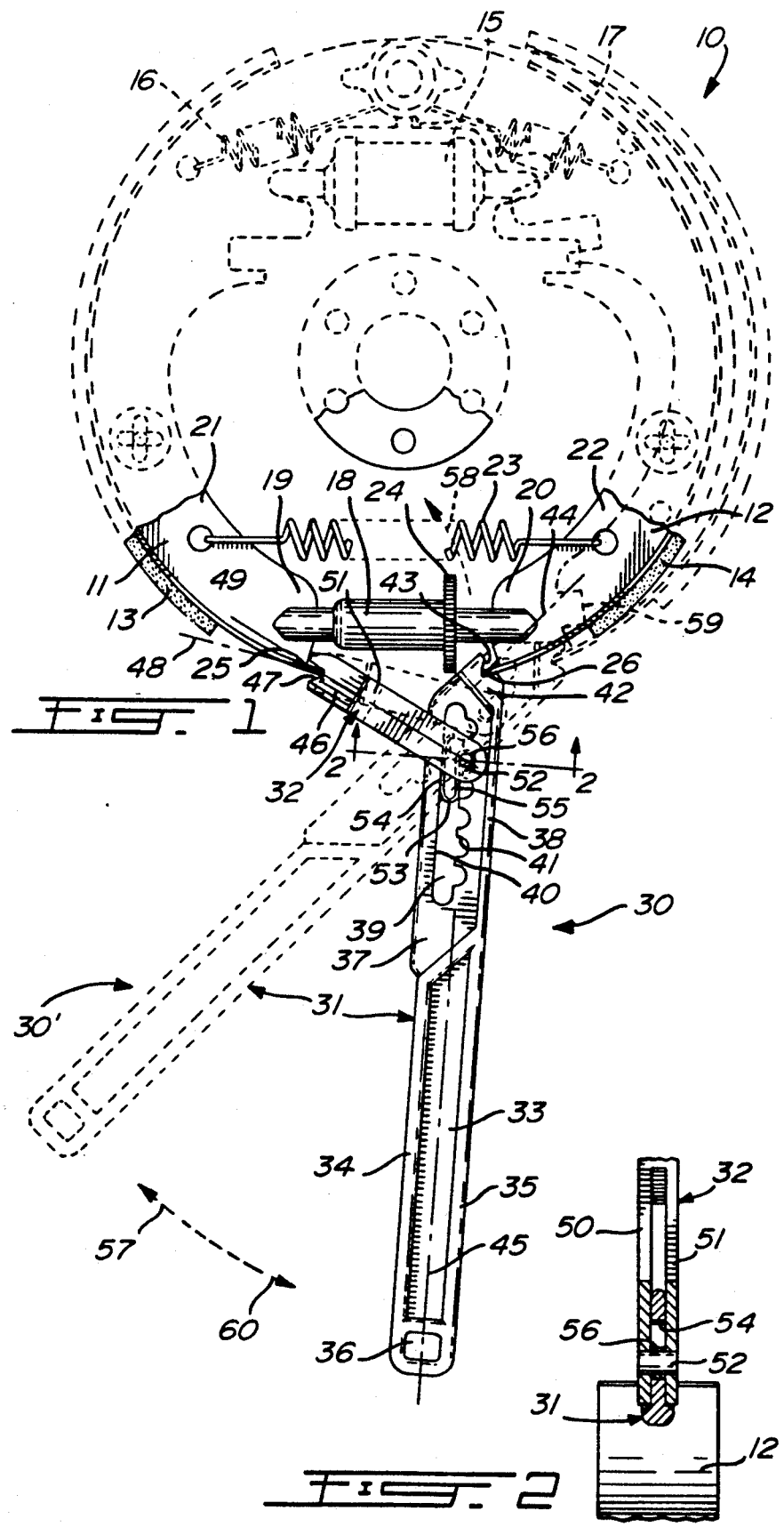

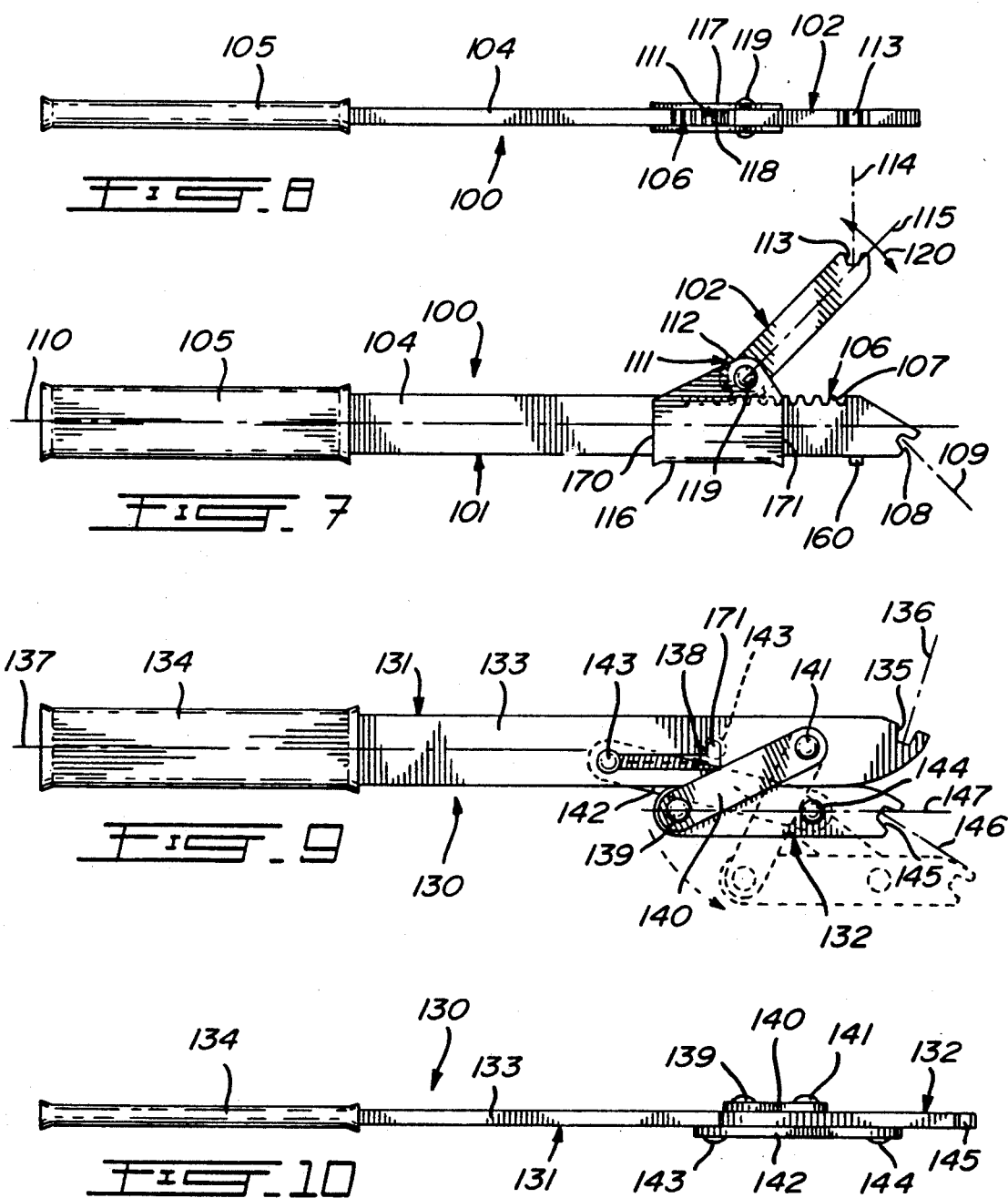

TOOL FOR MOVING TWO MECHANICAL PIECES AWAY FROM EACH OTHER

BACKGROUND OF THE INVENTION

1. Field of the Invention

The present invention relates to a tool capable of moving two mechanical pieces away from each other. More specifically, the invention is concerned with a tool of the type comprising first and second, pivotally interconnected arms each comprising a notched free end for engaging an edge of a respective mechanical piece.

2. Brief Description of the Prior Art

U.S. Pat. No. 4,768,408 granted to the Applicant on Sep. 6, 1988, describes a tool of the above type capable of moving the semicircular shoes of a drum brake away from each other in order to release the automatically adjustable spacer. As well known in the art, this spacer is mounted between two adjacent ends of the semicircular brake shoes and its length is automatically increased as the brake linings of the shoes wear in order to maintain a determined spacing between the linings and the inner cylindrical surface of the drum when no braking operation is performed. Usually, the spacer is lengthened by means of a well known mechanism in response to too ample a movement of the brake shoes upon breaking. This prevents reduction of the braking performances as the brake linings wear, caused by excessive longitudinal movement of the pistons of the wheel cylinder.

At the level of the spacer, the brake shoes are biased toward each other by at least one helicoidal spring, whereby this spacer is squeezed between the shoes. In order to release the spacer for maintenance or repair purposes, the brake shoes must be moved away from each other against the biasing force produced by the spring. A tool is usually required to carry out this task.

The tool of U.S. Pat. No. 4,768,408 has been designed to carry out this operation. It comprises a first arm having an handgrip portion and an arcuate arm portion formed with a notched free end. It also comprises a second arm with a notched free end and with a proximate end pivotally connected to the arcuate portion of the first arm. The drum brake shoes comprise generally facing transversal edges capable of being engaged by the notched free ends of the first and second arms. When the notches of the first and second arms are engaged with the generally facing edges of the brake shoes, the handgrip portion can be pushed toward the second arm to move the brake shoes away from each other and release the spacer to remove, adjust or install it.

As the notches of the prior art tool are oriented in the direction of the longitudinal axes of the arms, the portion of the first arm between the handgrip portion and its notched end must be arcuate in order to enable full engagement of the notches with the generally facing edges before operating the tool to move the brake shoes away from each other.

The tool of U.S. Pat. No. 4,768,408 therefore presents the drawback of comprising an arcuate arm portion. This is susceptible to complicate manufacture of the tool and to increase its cost on the market when certain techniques of production are used, for example when the arcuate arm portion is obtained by curving a bar of steel. Also, the curvature in the arcuate arm portion complicates the conception of any mechanism capable of adjusting the position of the pivotal connection along at least one of the arms in function of the distance separating the generally facing edges of the brake shoes. The arcuate arm portion further increases the tool's bulkiness; storage of the tool accordingly requires additional space in the toolbox. Moreover, when a die is used to manufacture the tool, the larger overall dimensions of the arm including the arcuate portion increase the cost of the die.

OBJECTS OF THE INVENTION

An object of the present invention is therefore to provide a tool of the above type which may comprise two straight arms.

Another object of the invention is a tool comprising two arms having respective longitudinal axes and respective end notches each being oriented in a direction different from that of the longitudinal axis of the corresponding arm.

SUMMARY OF THE INVENTION

More specifically, in accordance with the present invention, there is provided a tool for moving first and second mechanical pieces away from each other, these first and second mechanical pieces comprising respective first and second generally facing edges. The tool of the invention comprises:

a first arm including a handgrip portion, and having a first free end and a first longitudinal axis;

a second arm having a second free end and a second longitudinal axis;

a pivotal connection for interconnecting the first and second arms, this pivotal connection being spaced apart from the first and second free ends;

a first notch formed on the first free end and structured to engage the second edge; and a second notch formed on the second free end and structured to engage the second edge.

At least one of the first and second notches is oriented in a direction different from that of the longitudinal axis of the corresponding arm to enable the notches to fully engage the edges before the first and second arms are manually pivoted about the pivotal connection and through the handgrip portion to move the mechanical pieces away from each other.

The tool of the present invention is particularly, but not exclusively adapted to move first and second drum brake shoes away from each other to release an adjustable spacing member having opposite ends engaging respective, generally facing portions of the brake shoes, these first and second brake shoes being spring-biased toward each other and comprising respective first and second generally facing edges in the region of the spacing member.

Preferably, the first notch is oriented in a direction defining an acute angle with the first longitudinal axis, and the second notch is also oriented in a direction defining an acute angle with the second longitudinal axis. This presents the advantage of enabling construction of a tool having first and second, straight arms.

According to other preferred embodiments of the invention, (a) the first and second notches each comprise a pair of divergent edge surfaces, and (b) the pivotal connection comprises a pivot interconnecting the first and second arms and a mechanism for displacing this pivot along at least one of the first and second arms without disassembling said arms, whereby the tool can be adjusted to different spacings between the generally facing edges.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is a side elevational view illustrating a first embodiment of the tool in accordance with the invention, used to move the two semicircular shoes of a drum brake away from each other;

FIG. 2 is a cross sectional view of the tool of FIG. 1 taken along line 2—2 of FIG. 1;

FIG. 7 is a side elevational view of a third embodiment of the tool of the invention;

FIG. 8 is an elevational view of an edge of this third embodiment;

FIG. 9 is a side elevational view of a fourth embodiment of the tool according to the invention; and FIG. 10 is an elevational view of an edge of the fourth embodiment of FIG. 9.

DETAILED DESCRIPTION OF THE PREFERRED EMBODIMENTS

Figure 3:
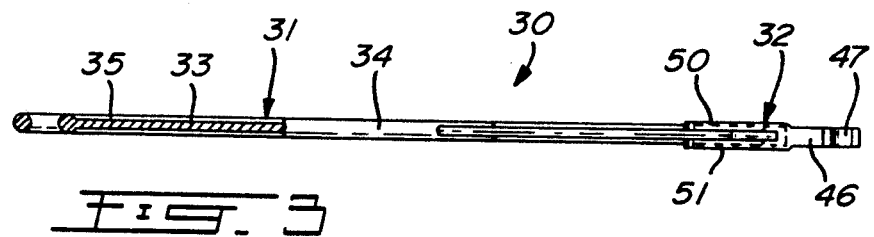
FIG. 3 is an elevational view, partially cross sectional, of an edge of the tool of FIGS. 1 and 2.

Although the present invention will be described in detail in the following description with reference to a drum brake of which the shoes are moved away from each other, it will appear to those skilled in the art that the tool, object of the present invention, can be used for moving other types of mechanical pieces away from each other.

As well known in the art, a conventional drum brake 10 (FIG. 1) comprises a pair of semicircular and concentric shoes 11 and 12, T-shaped in cross section and each provided with an outer brake lining 13,14. Upon a braking operation, a wheel cylinder 15 moves the shoes 11 and 12 away from each other until the brake linings 13 and 14 contact the inner cylindrical surface of the drum (not shown). The friction produced by the linings 13 and 14 on the drum causes braking. When the brake pedal is released, at least one return spring such as 16 and 17 moves the shoes 11 and 12 back to their initial position. As the linings 13 and 14 wear, a spacer 18, interposed between the indented (see for example 59 in FIG. 1) ends 19 and 20 of respective reinforcing, radial inner webs 21 and 22 of the brake shoes, is lengthened to maintain a determined spacing between the linings 13 and 14 and the inner surface of the drum when no braking is performed. The spacer 18 comprises slotted ends engaging the indented ends 19 and 20, and a spring 23 biases these ends of the webs 21 and 22 toward each other to squeeze the spacer 18. The adjustable spacer 18 is usually formed of two threaded portions screwed one within the other whereby the length of the spacer 18 can be automatically increased by a mechanism (not shown) rotating the notched, annular flange 24, in response to too ample a movement of the brake shoes 11 and 12 and wheel cylinder 15 upon a braking operation. The length of the spacer 18 can also be manually adjusted through the notched flange 24.

The lower adjacent ends of the shoes 11 and 12 present respective horizontal and transversal edges 25 and 26 generally facing each other.

A first embodiment of the tool in accordance with the present invention will now be described with reference to FIGS. 1, 2 and 3. This tool, generally identified by the reference numeral 30, comprises a first arm 31 and a second arm 32.

The first arm 31 comprises a flat, elongated handgrip portion 33 reinforced by thicker longitudinal opposite edges 34 and 35. The free end of the handgrip portion 33 is formed with a square hole 36 enabling hooking of the tool 30.

The first arm 31 also comprises an elongated flat portion 37 connected to the handgrip portion 33 and reinforced by a longitudinal thicker edge 38 prolongating the edge 35. An elongated and longitudinal slot 39 is formed in the flat portion 37 and defines a first longitudinal straight edge surface 40 and another opposite edge surface formed with a series of semicircular indentations such as 41.

The free end of the arm 31, opposite to the hole 36, includes a generally trapezoidal thicker end portion 42 provided with a V-shaped notch 43. This notch 43 is oriented in a direction 44 defining an acute angle with the longitudinal axis 45 of the arm 31.

The second arm 32 comprises a flat portion 46 of which the free end is formed with a V-shaped notch 47. Again, the notch 47 is oriented in a direction 48 defining an acute angle with the longitudinal axis 49 of the arm 32.

The arm 32 also comprise a pair of parallel flat arms 50 and 51 spaced apart from each other by a distance slightly greater than the thickness of the flat portion 37 of the first arm 31. The free ends of the arms 50 and 51 are positioned on the respective sides of the flat portion 37 and are interconnected by a cylindrical pivot 52 extending through the elongated slot 39 whereby the arm 32 is pivotally connected to the arm 31 through the slot 39 and the pivot 52.

A U-shaped spring 53 has a first branch 54 resting on the edge surface 40 of the slot 39, and a second branch 55 having a free end forming an eye 56 surrounding the pivot 52.

In operation, the position of the pivot 52 in the slot 39 is first adjusted in function of the distance between the generally facing edges 25 and 26. This is carried out by pushing the pivot 52 and eye 56 out of the indentation 41 in which they are located through compression of the spring 53 to move its branches 54 and 55 toward each other. The pivot 52 and eye 56 can then be moved longitudinally in the slot 39 in either direction with the branch 54 of the spring 53 sliding on the edge surface 40 until the pivot 52 reaches the desired indentation where the compression of the spring 53 is released to enable this spring to push and maintain the pivot 52 in this indentation 41.

The notches 43 and 47 are then engaged with the edges 25 and 26 or 26 and 25, respectively. It should be pointed out here that the above described orientation of the notches 43 and 47 enables full engagement of these notches with the respective edges of the shoes 11 and 12 before moving these shoes away from each other. The tool 30 is then manually operated through its handgrip portion 33; the handgrip portion 33 is pushed in the direction 57 (FIG. 1) to pivot the arms 31 and 32 about the pivot 52 and move the brake shoes away from each other. When the tool 30 reaches the position 30' shown in dashed lines on FIG. 1, the slotted ends of the spacer 18 are disengaged from the indented ends 19 and 20 of the inner webs 21 and 22 whereby the spacer 18 can be easily removed, adjusted or installed (see for example arrow 58). During this operation, the pivot 52 and eye 56 rest firmly in one of the indentations 41. After removal, adjustment or installation of the spacer 18, the arm 31 is pivoted back to its initial position (see arrow 60) to permit disengagement of the notches 43 and 47 from the edges 25 and 26.

Figure 4:
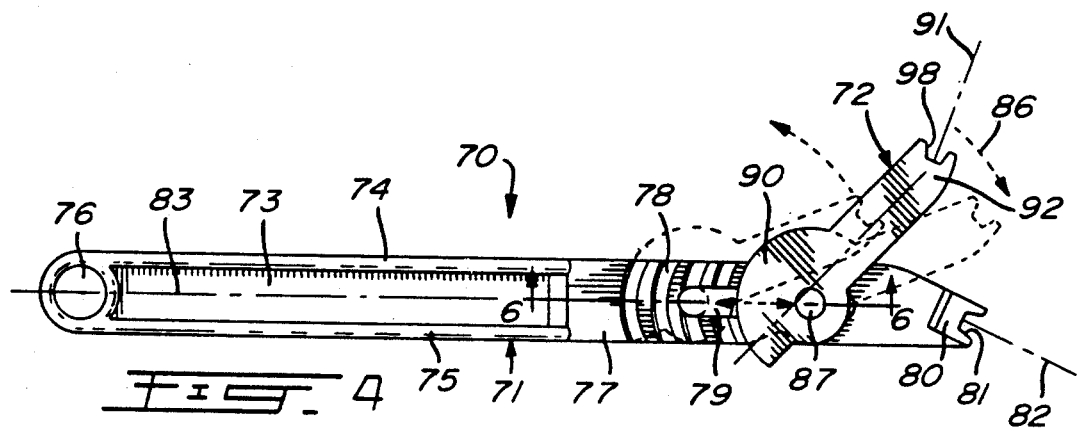
FIG. 4 is a side elevational view of a second embodiment of the tool in accordance with the present invention.
Figure 5:
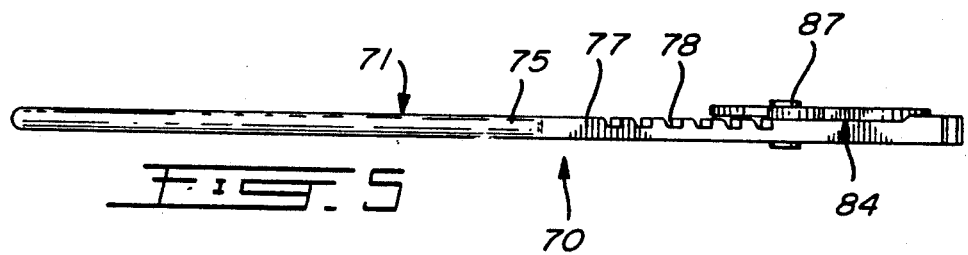
FIG. 5 is an elevational view of an edge of the tool of FIG. 4.
Figure 6:
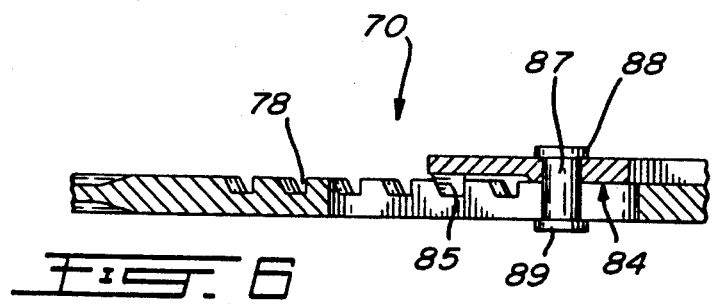
FIG. 6 is a cross sectional, enlarged view of a portion of the second embodiment of the tool, taken along line 6—6 of FIG. 4.

A second embodiment of the tool in accordance with the present invention will now be described with reference to FIGS. 4, 5 and 6 of the appended drawings. This tool, generally identified by the reference numeral 70, comprises a first arm 71 and a second arm 72.

The first arm 71 comprises a flat, elongated handgrip portion 73 reinforced by thicker longitudinal opposite edges 74 and 75. The free end of the handgrip portion 73 is formed with a circular hole 76 enabling hooking of the tool 70.

The first arm 71 also comprises a planar surface 77 connected to the handgrip portion and in which a plurality of semicircular channels such as 78 are made. All the channels 78 have the same radius. This section the first arm 71 is also formed with a centered, elongated and longitudinal slot 79.

The free end of the arm 71, opposite to the hole 76, includes a generally rectangular thicker end portion 80 formed with a U-shaped notch 81 defining a generally flat base surface and two divergent edge surfaces. The notch 81 is also oriented in a direction 82 defining an acute angle with the longitudinal axis 83 of the arm 71.

The second arm 72 comprises a semilunar proximate end 90 presenting a flat surface 84 facing the surface 77 of the arm 71. This surface 84 is formed with semicircular tongue 85, having the same radius as the channels 78 to fit into these channels. The tongue 85 is centered on a rivet-like pivot 87. The latter pivot passes through a hole in the semilunar end 90 and passes also through the elongated slot 79. The pivot 87 comprises end flanges 88 and 89 to pivotally attach the arms 71 and 72 together.

The second arm 72 further comprises a distal free end formed with a U-shaped notch 98. The notch 98 comprises a flat base surface and a pair of divergent edge surfaces. Again, the notch 98 is oriented in a direction 91 defining an acute angle with the longitudinal axis 92 of the arm 72.

In operation, the position of the pivot 87 in the slot 79 is first adjusted in function of the distance between the generally facing edges 25 and 26 (FIG. 1). This is carried out by pivoting the arm 72 with respect to the arm 71 in the direction 86 until the longitudinal axes 83 and 92 are parallel, in which position the tongue 85 disengages the channels 78. Maintaining this angular position of the arms, the pivot 87 can be displaced longitudinally in the slot 79 in either direction. The arm 72 is then pivoted with respect to the arm 71 to engage the tongue 85 in one of the channels 78 to maintain the adjusted position of the pivot 87 in the slot 79. This channel is then centered on the pivot 87 to enable sliding of the tongue 85 therein.

The notches 81 and 98 are then engaged with the edges 25 and 26 or 26 and 25, respectively. Again the above described orientation of the notches 81 and 98 enables full engagement of these notches with the respective edges of the shoes 11 and 12 before moving these shoes away from each other. The tool 70 is then operated through its handgrip portion 73 as described above with reference to the embodiment 30 illustrated in FIGS. 1-3 to impart pivotal movement to the arms 71 and 72 and move the brake shoes away from each other. It should however be pointed out that the design of the tool 70, in particular the position of the tongue 85 and the channels 78 on the flat surfaces 84 and 77, respectively, must be selected to keep this tongue engaged in the channel upon pivotal movement of the arms to move the brake shoes away from each other.

A third embodiment of the tool in accordance with the present invention will now be described with reference to FIGS. 7 and 8. This tool, generally identified by the reference numeral 100, comprises a first arm 101 and a second arm 102.

The first arm 101 is made of an elongated flat bar 104 having an end covered with a layer of rubber or plastic material to form a handgrip portion 105.

The end of the first arm 101, opposite to the handgrip portion 105, comprises a longitudinal toothed edge portion 106 comprising a series of teeth such as 107, and a U-shaped notch 108 oriented in a direction 109 defining an acute angle with the longitudinal axis 110 of the arm 101. The notch 109 defines a generally flat base surface and a pair of divergent edge surfaces.

The second arm 102 comprises a proximate end with a semicircular toothed edge portion 111 including a series of teeth such as 112 and extending over an angle of 90 degrees. A sliding member 116 has a U-shaped cross section to embrace the bar 104 and is formed with a pair of flat branches 117 and 118 respectively disposed on opposite sides of this bar 104. A rivet-like pivot 119 passes through the free ends of the branches 117 and 118 and through the proximate end of the arm 102 to pivotally attach this arm to the sliding member 116. The toothed semicircular edge portion 111 is centered on the pivot 119, which is so positioned on the sliding member 116 as to mesh the teeth 112 of the semicircular edge portion 111 with those 107 of the longitudinal edge portion 106.

The second arm 102 further comprises a distal free end formed with a U-shaped notch 113, comprising a flat base surface and a pair of divergent edge surfaces. Again, the notch 113 is oriented in a direction 114 defining an acute angle with the longitudinal axis 115 of the arm 102.

In operation, the position of the pivot 19 along the arm 101 is first adjusted in function of the distance between the generally facing edges 25 and 26 (FIG. 1). This is carried out by pivoting the arm 102 with respect to the arm 101 in the direction 120 until the longitudinal axes 110 and 115 are parallel and the teeth 112 of the semicircular edge portion 111 disengage the teeth 107 of the longitudinal edge portion 106. Maintaining this angular position of the arms, the member 116 can be slid and displaced in either direction along the arm 101 until the desired position is reached. The arm 102 can then be pivoted again with respect to the arm 101 to mesh again the teeth 107 and 112 and maintain the adjusted position of the pivot 119 along the arm 101.

A small stopper 160 limits sliding of the member 116 toward the end of the arm 101 to thereby prevent disassembly of the arms 101 and 102.

The notches 108 and 113 are then engaged with the edges 25 and 26 or 26 and 27, respectively. Again the above described orientation of the notches 108 and 113 enables full engagement of these notches with the respective edges of the shoes 11 and 12 before moving these shoes away from each other. The tool 100 is then operated through its handgrip portion 105 as described above with reference to the embodiment 30 illustrated in FIGS. 1-3 to pivot the arms 101 and 102 and move the brake shoes away from each other. It should however be pointed out that the design of the tool 100, in particular the toothed edge portions 106 and 111, must be selected to keep the teeth 107 and 112 meshed together upon pivotal movement of the arms to move the brake shoes away from each other. During moving of the brake shoes away from each other, the pivot 119 will move a short distance along the arm 101 due to rotation of the toothed edge portion 111 meshed with the longitudinal toothed portion 106. This will also cause longitudinal movement of the sliding member along the arm 101. The edge portions 170 and 171 of the sliding member 116 slightly curves outwardly to facilitate such longitudinal sliding.

A fourth embodiment of the tool in accordance with the present invention will now be described with reference to FIGS. 9 and 10. This embodiment, generally identified by the reference numeral 130, comprises a first arm 131 and a second arm 132.

The first arm 131 is made of an elongated flat bar 133 having an end covered with a layer of rubber or plastic material to form a handgrip portion 134.

The end of the first arm 131, opposite to the handgrip portion 134, comprises a U-shaped notch 135 oriented in a direction 136 defining an acute angle with the longitudinal axis 137 of the arm 131. The notch 135 defines a generally flat base surface and a pair of divergent edge surfaces.

The arm 131 is further provided with an L-shaped slot 138 of which the longer leg is longitudinally oriented and of which the shorter leg is transversal and located on the side corresponding to the notch 135. As can be seen, the slot 138 is situated between the notch 135 and the handgrip portion 134.

The second arm 132 is also made of a flat bar and comprises a proximate end pivotally connected through a rivet-like pivot 139 to the first end of an elongated flat member 140 having a second end pivotally connected to the arm 131 through another rivet-like pivot 141 situated between the slot 138 and the notch 135. Another elongated flat member 142 has a first end pivotally connected to the first arm 131 through a rivet-like pivot 143 extending through the L-shaped slot 138, and a second end pivotally connected to the arm 132 through a rivet-like pivot 144 located between the pivot 139 and the free distal end of this arm 132. As can be seen, the first and second flat arms 131 and 132 have the same thickness, the elongated flat member 140 is situated on a first side of the arms 131 and 132 while the elongated flat member 142 is situated on the other side of the flat arms 131 and 132. The arm 142 is longer than the arm 140 and these two arms cross each other.

The distal free end of the second arm 132 comprises a U-shaped notch 145, comprising a flat base surface and a pair of divergent edge surfaces. Again, the notch 145 is oriented in a direction 146 defining an acute angle with the longitudinal axis 147 of the arm 132.

In operation, the pivot 143 is placed at the free end 171 of the shorter leg of the L-shaped slot 138 (see in FIG. 9 the position of the arm 132 and elongated flat members 140 and 142 shown in dashed lines). The notches 135 and 145 are then engaged with the edges 25 and 26 or 26 and 25, respectively. Again the above described orientation of the notches 135 and 145 enables full engagement of these notches with the respective edges of the shoes 11 and 12 before moving these shoes away from each other. As can be appreciated, the four-arm design of the tool 130 enables operation of this tool through its handgrip portion 134 to pivot the different arms and members 131, 132, 140 and 142 about the pivots 139, 141, 143 and 144 to spread the notches 135 and 145 apart from each other and accordingly move the brake shoes away from each other. In the embodiment of FIGS. 9 and 10, no adjustment of the tool 130 in function of the distance between the edges 25 and 26 is required as the four-arm design provides for spreading of the notches 135 and 145 apart from each other within a sufficient range of distances.

When the tool 130 is not used and placed in a toolbox, the pivot 143 is placed at the free end of the longer leg of the L-shaped slot 138 to position the arm 132 against the arm 131 and thereby reduce the tool's bulkiness, as illustrated in full lines in FIG. 9.

Obviously, the four embodiments of the tool according to the present invention described in the foregoing description can be made of tempered steel using conventional techniques.

Although the present invention has been described hereinabove by way of preferred embodiments thereof, such embodiments can be modified at will, within the scope of the appended claims, without departing from the spirit and nature of the subject invention.

What is claimed is:

1. A tool for moving first and second mechanical pieces away from each other, said first and second mechanical pieces comprising respective first and second generally facing edges, said tool comprising:
    a first arm including a handgrip portion, and having a first free end and a first longitudinal axis;
    a second arm having a second free end and a second longitudinal axis;
    a pivotal connection for interconnecting said first and second arms, said connection being spaced apart from said first and second free ends;
    a first notch formed on said first free end and structured to engage said first edge; and
    a second notch formed on said second free end and structured to engage said second edge;
    wherein said first and second notches are engaged with said first and second edges, respectively, and said first and second arms are then manually pivoted about said pivotal connection and through the handgrip portion to move the mechanical pieces away from each other;
    said pivotal connection comprising (a) a pivot interconnecting the first and second arms, and (b) a mechanism for displacing said pivot along at lest one of said fist and second arms without disassembling said arms, said mechanism comprising (i) an elongated and longitudinal slot formed in one of said first and second arms, said pivot extending through said slot which comprises a longitudinal edge surface formed with a series of indentations each structured to receive the pivot, and (ii) means for retaining the pivot in any of said indentations but enabling transfer of the pivot from one indentation to the other.

2. The tool of claim 1, wherein said pivot retaining means comprises a U-shaped spring including (a) a first branch having a free end attached to said pivot, and (b) a second branch resting against a second longitudinal edge surface of said elongated slot.

3. The tool of claim 1, wherein at least one of said first and second notches is oriented in a direction different from that of the longitudinal axis of the corresponding arm to enable said notches to fully engage said edges before said first and second arms are manually pivoted about said pivotal connection and through the handgrip portion to move the mechanical pieces away from each other.

4. The tool of claim 3, wherein said at least one notch is oriented in a direction defining an acute angle with the longitudinal axis of the corresponding arm.

5. The tool of claim 3, wherein the first notch is oriented in a direction defining an acute angle with said first longitudinal axis, and wherein the second notch is oriented in a direction defining an acute angle with said second longitudinal axis.

6. The tool of claim 3, wherein said first arm is straight.

7. The tool of claim 3, wherein said first and second arms are straight.

8. The tool of claim 3, wherein said first and second notches each define a pair of divergent edge surfaces.

9. A tool for moving first and second drum brake shoes away from each other to release an adjustable spacing member having opposite ends engaging respective, generally facing portions of said shoes, said first and second brake shoes being spring-biased toward each other and comprising respective first and second generally facing edges in the region of the spacing member, said tool comprising:

a first arm including a handgrip portion, and having a first free end and a first longitudinal axis;

a second arm having a second free end and a second longitudinal axis;

a pivotal connection for interconnecting said first and second arms, said pivotal connection being spaced apart from said first and second free ends;

a first notch formed on said first free and structured to engage said first edge; and a second notch formed on said second free end and structured to engage said second edge;

wherein said first and second notches are engaged with said first and second edges, respectively, and said first and second arms are then manually pivoted about said pivotal connecting and through the handgrip portion to move the brake shoes away from each other;

said pivotal connection comprising (a) a pivot interconnecting the first and second arms, and (b) a mechanism for displacing said pivot along at least one of said first and second arms without disassembling said arms, said mechanism comprising (i) an elongated and longitudinal slot formed in one of said first and second arms, said pivot extending through said to which comprises a longitudinal edge surface formed with a series of indentations each structured to receive the pivot, and (ii) means for retaining the pivot in any of said indentations but enabling transfer of the pivot from one indentation to the other.

10. The tool of claim 9, wherein said pivot retaining means comprises a U-shaped spring including (a) a fist branch having a free end attached to said pivot, and (b) a second branch resting against a second longitudinal edge surface of said elongated slot.

11. The tool of claim 9, wherein at least one of said first and second notches is oriented in a direction different from that of the longitudinal axis of the corresponding arm to enable said notches to fully engage said edges before said first and second arms are manually pivoted about said pivotal connection and through the handgrip portion to move the mechanical pieces away from each other.

12. The tool of claim 11, wherein said at least one notch is oriented in a direction defining an acute angle with the longitudinal axis of the corresponding arm.

13. The tool of claim 11, wherein the first notch is oriented in a direction defining an acute angle with said first longitudinal axis, and wherein the second notch is oriented in a direction defining an acute angle with said second longitudinal axis.

14. The tool of claim 11, wherein said first and second arms are straight.

* * * * *